US008922474B2

(12) United States Patent
Kerofsky

(10) Patent No.: US 8,922,474 B2
(45) Date of Patent: Dec. 30, 2014

(54) METHOD OF PERFORMING OFF AXIS HALO REDUCTION BY GENERATING AN OFF-AXIS IMAGE AND DETECTING HALO ARTIFACTS THEREIN

(75) Inventor: Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 453 days.

(21) Appl. No.: 12/658,408

(22) Filed: Feb. 10, 2010

(65) Prior Publication Data

US 2011/0193870 A1 Aug. 11, 2011

(51) Int. Cl.
*G09G 3/36* (2006.01)
*G09G 5/00* (2006.01)
*G06F 3/038* (2013.01)
*G09G 3/34* (2006.01)

(52) U.S. Cl.
CPC ...... *G09G 3/3426* (2013.01); *G09G 2320/0233* (2013.01); *G09G 2320/028* (2013.01); *G09G 2320/0646* (2013.01); *G09G 2360/144* (2013.01)
USPC ........................................ 345/102; 345/691

(58) Field of Classification Search
USPC .................... 345/87–104, 204–215, 690–699
See application file for complete search history.

(56) References Cited

U.S. PATENT DOCUMENTS

2007/0211013 A1* 9/2007 Uehara et al. ................. 345/102
2009/0015539 A1* 1/2009 Rumreich et al. ............ 345/102
2009/0161983 A1* 6/2009 Ciurea .......................... 382/275
2009/0184916 A1* 7/2009 Miyazaki et al. ............. 345/102
2009/0322800 A1* 12/2009 Atkins .......................... 345/690
2010/0289833 A1* 11/2010 Budzelaar et al. ............ 345/690
2010/0309298 A1* 12/2010 Muijs et al. ..................... 348/59
2011/0210912 A1* 9/2011 Jenkins et al. ................ 345/102
2011/0285681 A1* 11/2011 Kondoh et al. ............... 345/207

FOREIGN PATENT DOCUMENTS

CN 101029985 A 3/2007
JP 2007-322944 A 12/2007
JP 2008-51905 A 3/2008
JP 2009-237510 A 10/2009
WO 2009095819 A1 8/2009

OTHER PUBLICATIONS

International Search Report and Written Opinion, dated Nov. 9, 2010 in co-pending International App. No. PCT/JP2010/063732, filed Aug. 6, 2010, 6 pgs.

(Continued)

*Primary Examiner* — Chanh Nguyen
*Assistant Examiner* — Navin Lingaraju
(74) *Attorney, Agent, or Firm* — Chernoff Vilhauer McClung & Stenzel, LLP

(57) ABSTRACT

A method for modifying an image to be displayed on a display includes receiving an image to be displayed on the display having a backlight and a transmissive panel. A backlight signal is provided to the backlight for causing the backlight to selectively illuminate different portions of the backlight with different characteristics. The characteristics include at least one of a different color and a difference luminance. A panel signal is provided to the panel for causing the transmissive panel to selectively change its transmittivities. At least one of the backlight signal and the panel signal are modified in a manner to reduce off-axis artifacts in selected regions of the display.

16 Claims, 13 Drawing Sheets

(56) References Cited

OTHER PUBLICATIONS

European Search Report, dated Oct. 19, 2012, European Patent App. No. 10845780.5, Sharp Kabushiki Kaisha, 3 pgs.
Wu et al., "Viewing Direction-Aware Backlight Scaling," ACM, Mar. 13, 2007, pp. 281-286.
Japanese Office Action, Japanese Patent App. No. 2012-535481, Sharp Kabushiki Kaisha, mailed Jul. 9, 2013, 5 pgs.
English Translation of Japanese Office Action, Japanese Patent App. No. 2012-535481, Sharp Kabushiki Kaisha, mailed Jul. 9, 2013, 8 pgs.
Patent Abstract (English) of Japanese Patent App. No. 2006-155494, filed Jun. 3, 2006, Pub. No. 2007-322944, published Dec. 13, 2007, Sony Corp., 1 pg.
Patent Abstract (English) of Japanese Patent App. No. 2006-225849, filed Aug. 22, 2006, Pub. No. 2008-051905, published Mar. 6, 2008, Sharp Corp., 1 pg.
Patent Abstract (English) of Japanese Patent App. No. 2008-087019, filed Mar. 28, 2008, Pub. No. 2009-237510, published Oct. 15, 2009, Sharp Corp., 1 pg.
Chinese Office Action, Chinese Patent App. No. 201080063172.3, dated Jun. 18, 2014, 12 pgs.

* cited by examiner

METHOD OF PERFORMING OFF AXIS HALO REDUCTION BY GENERATING AN OFF-AXIS IMAGE AND DETECTING HALO ARTIFACTS THEREIN

CROSS-REFERENCE TO RELATED APPLICATIONS

Not applicable.

BACKGROUND OF THE INVENTION

The present invention relates generally to decreasing artifacts when a display is viewed off-axis.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to an observer or is blocked, is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed during its transits of the panel and images displayed on this type of panel may be difficult to see except under the best lighting conditions. On the other hand, LCD panels used for computer displays and video screens are typically backlit with fluorescent tubes or arrays of light-emitting diodes (LEDs) that are built into the sides or back of the panel. To provide a display with a more uniform light level, light from these point or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In a LCD the optical axes of the first and second polarizers are typically arranged at an angle so that light passing through the first polarizer would normally be blocked from passing through the second polarizer in the series. However, a layer of translucent liquid crystals occupies a cell gap separating the two polarizers. The physical orientation of the molecules of liquid crystal can be controlled and the plane of vibration of light transiting the columns of molecules spanning the layer can be rotated to either align or not align with the optical axes of the polarizers.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series polarizers of the translucent panel assembly to produce a lighted area of the display surface when viewed from the front of the panel.

To darken a pixel and create an image, a voltage, typically controlled by a thin film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

LCDs can produce bright, high resolution, color images and are thinner, lighter, and draw less power than cathode ray tubes (CRTs). As a result, LCD usage is pervasive for the displays of portable computers, digital clocks and watches, appliances, audio and video equipment, and other electronic devices. On the other hand, the use of LCDs in certain "high end markets," such as medical imaging and graphic arts, may demand an even greater dynamic range than available with cathode tube backlight based LCDs.

Another type of LCD display construction is to include a light emitting diode based backlight array. Such an array permits the individual selection of the luminance for individual elements of the backlight array. By selective illumination of the individual elements, different regions of the display may be selectively dimmed or otherwise turned off, which increases the dynamic range of the display.

Whatever configuration is used for the liquid crystal display, they generally have somewhat reduced performance when viewed from oblique directions. This reduced performance may manifest itself, for example, as decreased contrast, incorrect color rendering, and increased image artifacts. In many cases, some of these performance reductions are more pronounced at lower luminance levels. Residual light leakage, especially in oblique directions, also tends to limit the contrast range of the display at lower light levels.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
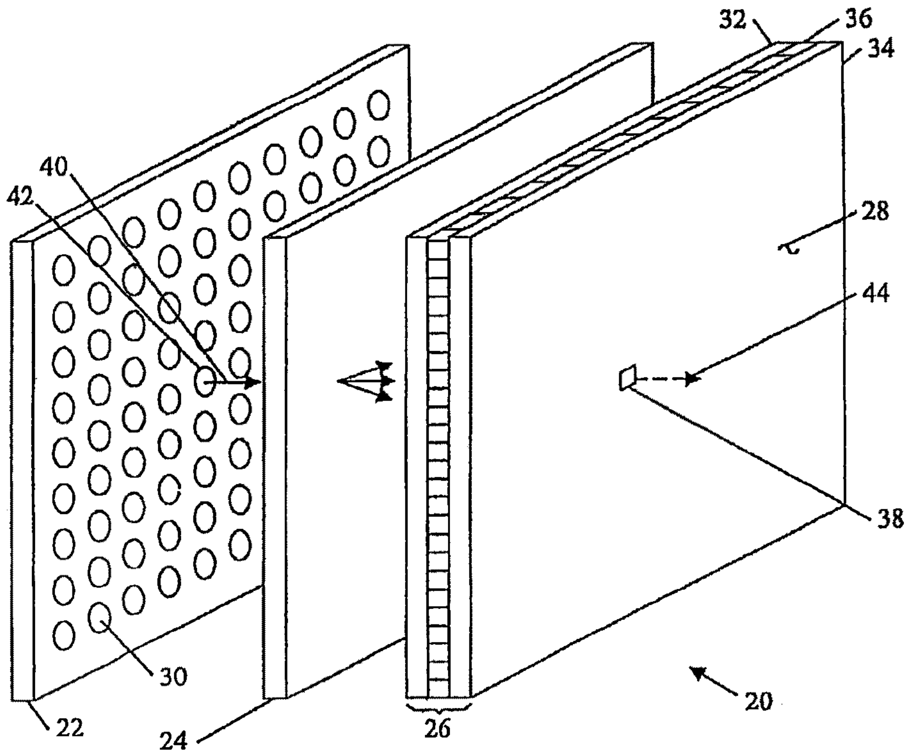
FIG. 1 illustrates a liquid crystal display.

Referring to FIG. 1, a preferred configuration of a liquid crystal display includes a backlit display 20 comprising, generally, a backlight 22, a diffuser 24, and a light valve 26 (indicated by a bracket) that controls the transmittance of light from the backlight 22 to a user viewing an image displayed at the front of the panel 28. The light valve, typically comprising a liquid crystal apparatus, is arranged to electronically control the transmittance of light for a picture element or pixel. Since liquid crystals do not emit light, an external source of light is necessary to create a visible image. The source of light for small and inexpensive LCDs, such as those used in digital clocks or calculators, may be light that is reflected from the back surface of the panel after passing through the panel. Likewise, liquid crystal on silicon (LCOS) devices rely on light reflected from a backplane of the light valve to illuminate a display pixel. However, LCDs absorb a significant portion of the light passing through the assembly and an artificial source of light such as the backlight 22 comprising fluorescent light tubes or an array of light sources 30 (e.g., light-emitting diodes (LEDs)), as illustrated in FIG. 1, is used to produce pixels of sufficient intensity for highly visible images or to illuminate the display in poor lighting conditions. There may not be a light source 30 for each pixel of the display and, therefore, the light from the point or line sources is typically dispersed by a diffuser panel 24 so that the lighting of the front surface of the panel 28 is more uniform. In most cases, the density of light sources is substantially less than that of the individual pixels of the liquid crystal layer.

Light radiating from the light sources 30 of the backlight 22 comprises electromagnetic waves vibrating in random planes. Only those light waves vibrating in the plane of a polarizer's optical axis can pass through the polarizer. The light valve 26 includes a first polarizer 32 and a second polarizer 34 having optical axes arrayed at an angle so that normally light cannot pass through the series of polarizers. Images are displayable with an LCD because local regions of a liquid crystal layer 36 interposed between the first 32 and second 34 polarizer can be electrically controlled to alter the alignment of the plane of vibration of light relative of the optical axis of a polarizer and, thereby, modulate the transmittance of local regions of the panel corresponding to individual pixels 36 in an array of display pixels.

The layer of liquid crystal molecules 36 occupies a cell gap having walls formed by surfaces of the first 32 and second 34 polarizers. The walls of the cell gap are rubbed to create microscopic grooves aligned with the optical axis of the corresponding polarizer. The grooves cause the layer of liquid crystal molecules adjacent to the walls of the cell gap to align with the optical axis of the associated polarizer. As a result of molecular forces, each succeeding molecule in the column of molecules spanning the cell gap will attempt to align with its neighbors. The result is a layer of liquid crystals comprising innumerable twisted columns of liquid crystal molecules that bridge the cell gap. As light 40 originating at a light source element 42 and passing through the first polarizer 32 passes through each translucent molecule of a column of liquid crystals, its plane of vibration is "twisted" so that when the light reaches the far side of the cell gap its plane of vibration will be aligned with the optical axis of the second polarizer 34. The light 44 vibrating in the plane of the optical axis of the second polarizer 34 can pass through the second polarizer to produce a lighted pixel 38 at the front surface of the display 28.

To darken the pixel 38, a voltage is applied to a spatially corresponding electrode of a rectangular array of transparent electrodes deposited on a wall of the cell gap. The resulting electric field causes molecules of the liquid crystal adjacent to the electrode to rotate toward alignment with the field. The effect is to "untwist" the column of molecules so that the plane of vibration of the light is progressively rotated away from the optical axis of the polarizer as the field strength increases and the local transmittance of the light valve 26 is reduced. As the transmittance of the light valve 26 is reduced, the pixel 38 progressively darkens until the maximum extinction of light 40 from the light source 42 is obtained. Color LCD displays are created by varying the intensity of transmitted light for each of a plurality of primary color elements (typically, red, green, and blue) elements making up a display pixel.

In the backlit display 20 with extended dynamic range, the backlight 22 comprises an array of locally controllable light sources 30. The individual light sources 30 of the backlight may be light-emitting diodes (LEDs), an arrangement of phosphors and lenslets, or other suitable light-emitting devices. The individual light sources 30 of the backlight array 22 are independently controllable to output light at a luminance level independent of the luminance level of light output by the other light sources so that a light source can be modulated in response to the luminance of the corresponding image pixel.

A data processing unit may extract the luminance of the display pixel from the pixel data if the image is a color image. For example, the luminance signal can be obtained by a weighted summing of the red, green, and blue (RGB) components of the pixel data (e.g., 0.33R+0.57G+0.11B). If the image is a black and white image, the luminance is directly available from the image data and the extraction step can be omitted. The luminance signal may be low-pass filtered with a filter having parameters determined by the illumination profile of the light source 30 as affected by the diffuser 24 and properties of the human visual system. Following filtering, the signal is subsampled to obtain a light source illumination signal at spatial coordinates corresponding to the light sources 30 of the backlight array 22. As the rasterized image pixel data are sequentially used to drive the display pixels of the LCD light valve 26, the subsampled luminance signal is used to output a power signal to the light source driver to drive the appropriate light source to output a luminance level according a relationship between the luminance of the image pixel and the luminance of the light source. Modulation of the backlight light sources 30 increases the dynamic range of the LCD pixels primarily by attenuating illumination of "darkened" pixels while the luminance of a "fully on" pixel is typically unchanged.

In general, while a liquid crystal display with individually selectable light-emitting elements is preferred, a liquid crystal display with a single adjustable or non-adjustable backlight may likewise be used.

As it may be observed, the transmissive properties of the display, in combination with the intensity of the backlight, determine what is visible from the display. Therefore, the transmittivity of the liquid crystal stack and the luminance of the backlight should be coordinated. If the backlight is dimmed, then the liquid crystal stack should become more transparent in order to maintain the same effective luminance. If the backlight is brightened, then the liquid crystal stack should become less transparent in order to maintain the same effective luminance. In this manner, different backlight intensities along with different corresponding transparencies may be used to achieve a uniform luminance level. Some display characteristics are associated with undesirable attributes, such as artifacts resulting from off-axis gamma distortion. The off-axis gamma distortion may depend on a difference between the perceived color or luminance when viewing the display from an orthogonal viewing direction compared to a perceived color or luminance when viewing the display from an oblique viewing direction. In some cases, the off-axis gamma distortion may manifest itself as a “halo” artifact.

The system may select the colors or luminances based on the content of the image and based on expected selected transmittivities, where the selection of the colors or luminance’s is based upon, at least in part, on expected selected transmittivities having a reduced off-axis gamma distortion. In this manner, transmittivities having reduced off-axis gamma distortion may be used to increase image quality.

The colors or luminances may be selected for colors or luminances corresponding to an increased transmittivity of the pixels and/or reduce transmittivity of the pixels. In many displays, and in particular for liquid crystal displays, the off-axis gamma distortion is relatively low toward the maximum transmittivity and the minimum transmittivity. This property may be used to reduce off-axis gamma distortion by selecting the backlight colors or luminances such that an increased transmittivity and/or reduced transmittivity are used, in comparison to what would have otherwise been used.

As described, the tone scale used to compute the driving pixel values generally agrees with the tone scale observed by the viewer of the output image when the display is viewed in an orthogonal direction. However, when the tone scale experienced by the viewer, such as a result of off-axis viewing, differs from the tone scale used to compute the driving pixels, then the image appears to have artifacts. In particular, with local dimming of the LCD, this change in tone scale with viewing angle may also result in visible halos around bright objects on a dim background when viewed off angle. This effect is more pronounced as any of the following factors change, such as, ambient light level decreases, viewing angle increases, and/or image contrast increases.

A LCD with local dimming capability may achieve power savings and high intra-frame contrast by using a backlight capable of spatial area modulation combined with spatial compensation of the image displayed on the liquid crystal layer. The pixel values of the original image are modified based on the selected backlight to determine corresponding transmittivity values. In general, the system divides the desired output image by the backlight to determine the value for the liquid crystal. The signal used to drive the liquid crystal is determined by further using the tone scale of the display. When the tonescale used by the viewer agrees with the tone scale used to compute the driving pixel values, the desired output image is observed. As previously noted, an artifact arises when the tonescale experienced by the viewer differs from the tonescale used to compute the driving pixel values. In this case the driving pixel values do not reproduce the desired output. A display with local backlight dimming may also result in a change in tone scale with viewing angle that results in visible halos around bright objects on dim backgrounds when viewed off-angle. This effect is more pronounced as any of the following factors change: ambient light level decreases, viewing angle increases, and/or image contrast increases.

Figure 2:
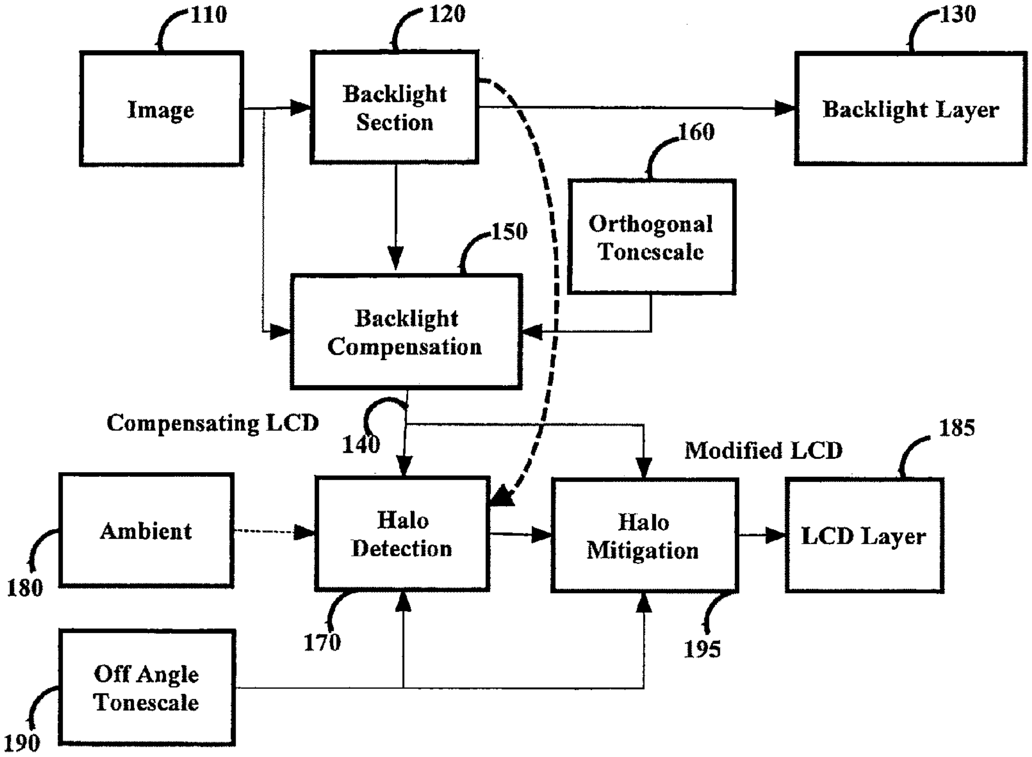
FIG. 2 illustrates a halo reduction architecture.

Referring to FIG. 2, one implementation of an off-axis artifact and reduction technique is a halo mitigation technique. The strength of the applied correction for a region is based upon a measure of the halo visibility in the region of the image. This avoid otherwise introducing artifacts into areas not containing sufficient halo artifacts while simultaneously permitting a strong halo mitigation technique to be applied to regions containing sufficient halos.

An input image 110 is received. A set of backlight values 120 are selected by the system for respective regions of the backlight, which are provided to the backlight layer 130 for illumination. To determine a suitable value for the corresponding LCD layer 140, a backlight compensation 150 is based upon the division of the image 110 by the backlight selection 120, or any other suitable technique. In addition, the backlight compensation 150 may be further based upon an orthogonal tonescale 160 for the display. A halo detection 170 technique may be applied based upon the compensated LCD image 140, and the backlight selection 120 which represents the image 110. Any suitable halo detection technique may be used. In particular, the halo detection technique preferably acts locally on the image so as not to identify regions not having sufficient halo effects. In addition, the halo detection technique may be based upon ambient light levels 180, and/or an off-angle tonescale 190. After halo detection 170 a halo mitigation 195 technique may be used to reduce the visibility of the detected halo. Any suitable halo mitigation technique may be used. In particular, the halo mitigation technique preferably acts locally on the image so as not to mitigate regions not having sufficient halo effects. Based upon the halo mitigation 195, a modified set of data is provided to the LCD layer 185. In general, regional mitigation of off-axis artifacts may be based upon regional areas of the image. Further, the regional mitigation for a particular image of a video is preferably performed by processing the single frame of the video.

Figure 3:
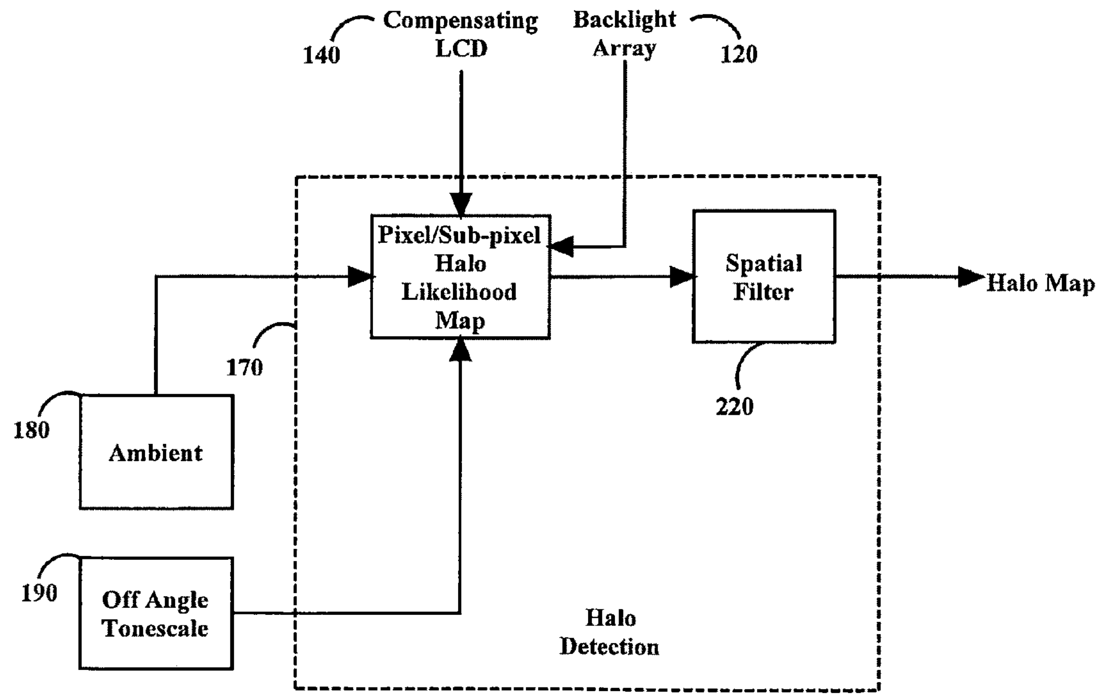
FIG. 3 illustrates a halo detection process.

Referring to FIG. 3, the halo detection 170 may be based upon pixels and/or subpixels contributing to a halo artifact. The halo detection 170 may be spatially filtered 220 to account for the spatial extent of the detected halo, i.e., isolated pixels or small regions may not contribute to identified halo artifacts.

More specifically, a luminance halo generally refers to luminance variation around bright objects when observed over a dark background. Some of the luminance halo is caused by scattering within the optics of the eye and is natural. Halo artifacts occur when a display introduces halos larger than would naturally be seen. In general, these artifacts are more pronounced with the following set of conditions: low ambient light level content, high frequency high contrast image, and/or off angle viewing.

Figure 4:
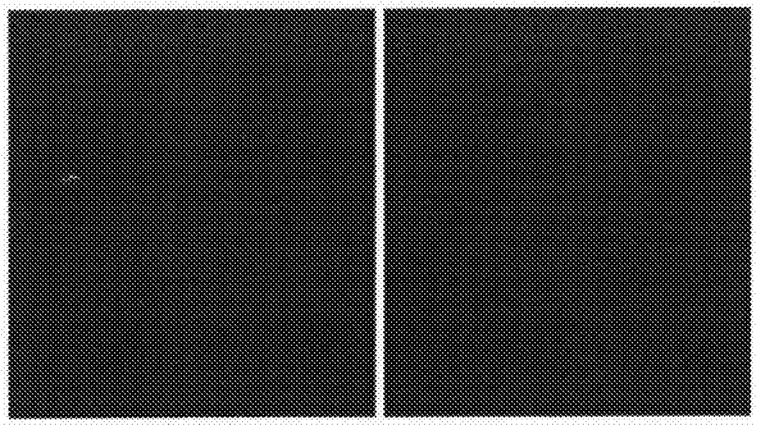
FIG. 4 illustrates a synthetic test target.
Figure 5:
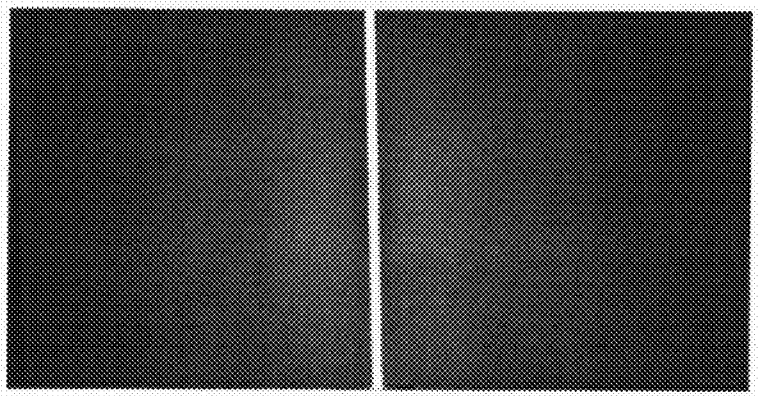
FIG. 5 illustrates a perpendicular view of the synthetic target of FIG. 4.
Figure 6:
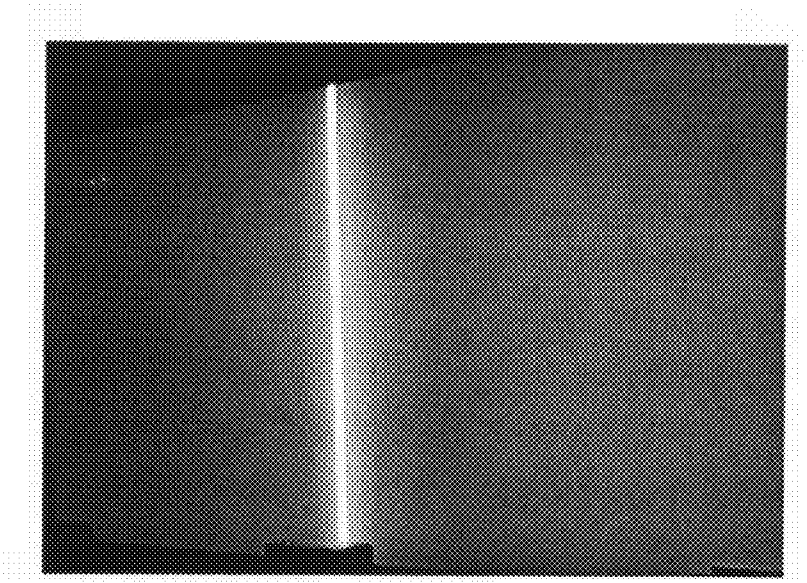
FIG. 6 illustrates an off-axis view of the synthetic target of FIG. 4.

Referring to FIG. 4, a synthetic image is used to illustrate the halo effect. As an illustration of the resulting halo artifact in an LCD with area active backlight using the synthetic image of FIG. 4 is shown in FIG. 5. FIG. 6 illustrates the effects of off-axis viewing with the synthetic image of FIG. 4.

Reduction in halo artifacts may include a compromise in other display attributes, such as intra-frame contrast and power consumption. As an extreme example, halo artifacts are reduced if global backlight modulation, rather than local backlight modulation, is used at the expense of intra-frame contrast and power savings. Also, placing a lower limit on the backlight modulation, the halo artifact is reduced at the expense of elevated black level and increased power consumption.

As illustrated, halo visibility results from tone scale variation when viewing the display off axis. In addition, off axis artifacts and/or halo artifacts may result from a spatial varying backlight and compensating image when viewed off angle, even when the image is flat. For example, a flat image displayed with a spatially varying backlight, together with compensating liquid crystal values, is computed so that the product of the backlight and the liquid crystal image viewed on axis is uniform. The variation in backlight is compensated by variation in the LCD image. When viewed using a different tone scale, i.e. off axis, spatial modulation is seen due to mismatch in the compensation image and the backlight variation. This is primarily a result of differences between the tonescale used to compute the compensation image and the tone scale used to view the image.

The derivation of the image used for backlight compensation is presented in Equation 1. Given an image to display, $I_0$, and a backlight signal B(x), the LCD image is $I_1$ computed by division in the linear domain followed by application of the inverse tone scale. The compensating image produces the desired display output when combined with the backlight signal. The calculation of the LCD image depends upon a tone scale to convert a linear light output to a set of driving values for the LCD. In Equation 1 below this is denoted by the orthogonal tonescale $T_{\perp}$.

Backlight compensation: Equation 1

$$Y_{\perp}(x) = T_{sRGB} \circ I_0(x)$$
$$Y_{\perp}(x) = T_{\perp} \circ I_1(x) \cdot B(x)$$
$$I_1(x) \equiv T_{\perp}^{-1} \circ \left(\frac{Y_{\perp}(x)}{B(x)}\right)$$

Next a derivation of the image seen when viewed off axis is provided. The image is produced by using the spatial backlight signal B(x), the compensating LCD image $I_1(x)$, and the off angle tonescale. This calculation is summarized in Equation 2.

Off angle view of compensated image: Equation 2

$$Y_L(x) = T_L \circ I_1(x) \cdot B(x)$$
$$Y_L(x) = T_L \circ T_{\perp}^{-1}\left(\frac{Y_{\perp}(x)}{B(x)}\right) \cdot B(x)$$

The error between the perpendicular and off angle images is computed in Equation 3. To derive the effect of the error on spatial modulation, the spatial derivative of the display error is calculated in Equation 4. The first term of Equation 4 is an image gradient term that is proportional to the spatial derivative of the image displayed. The second term of Equation 4 is a backlight gradient term that is proportional to the spatial derivative of the backlight signal.

Display Error (Linear Domain): Equation 3

$$Y_{\perp}(x) - Y_L(x) = Y_{\perp}(x) - T_L \circ T_{\perp}^{-1}\left(\frac{Y_{\perp}(x)}{B(x)}\right) \cdot B(x)$$

Spatial derivative of display error: Equation 4

$$\Delta = \frac{\partial}{\partial x}(Y_{\perp}(x) - Y_L(x))$$
$$\Delta = \left(1 - \frac{\partial(T_L \circ T_{\perp}^{-1})}{\partial y}\bigg|_{\frac{Y_{\perp}(x)}{B(x)}}\right)\frac{\partial(Y_{\perp}(x))}{\partial x} + \left(\frac{\partial(T_L \circ T_{\perp}^{-1})}{\partial x}\bigg|_{\frac{Y_{\perp}(x)}{B(x)}} \cdot \frac{Y_{\perp}(x)}{B(x)} - T_L \circ T_{\perp}^{-1}\left(\frac{Y_{\perp}(x)}{B(x)}\right)\right) \cdot \frac{\partial B(x)}{\partial x}$$

The image gradient term is proportional to image gradient which has off angle variation due to tone scale change, i.e., zero if no change in off angle tone scale. The backlight gradient term is proportional to backlight spatial gradient. This term does not exist without active area backlight modulation, i.e. zero for global backlight modulation. This error can be nonzero even when the image content is constant. This quantifies the image artifacts and visible spatial halo variations seen off angle, even when the LCD image is flat.

As a result, changes in tone scale can create spatial variation where there is none if there is backlight variation causing the compensated image to contain spatial information. This information is calculated to remove the backlight variation knowing the tone scale. If the tonescale differs from that used for compensation calculation, the resulting image will contain spatial variation.

Figure 7:
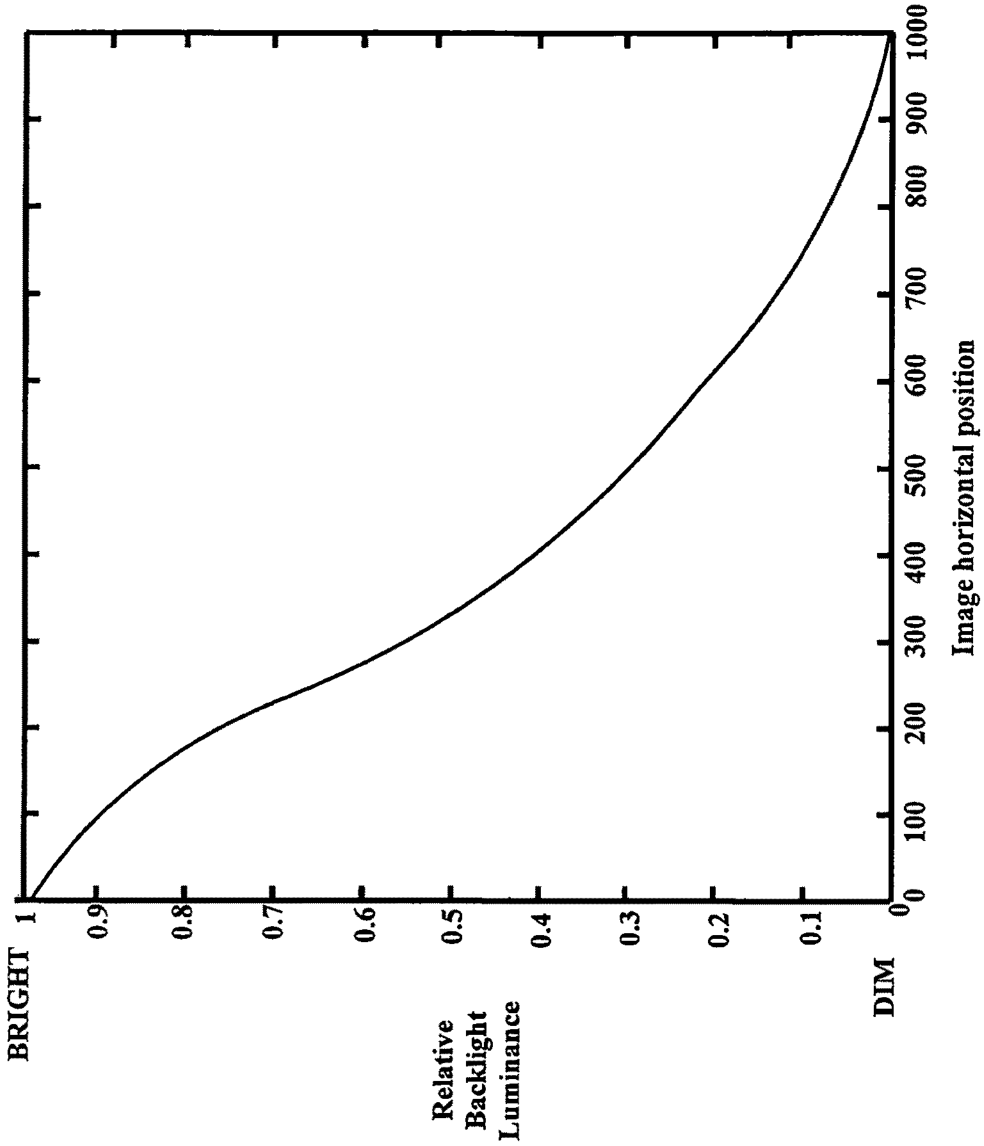
FIG. 7 illustrates spatial backlight variation.
Figure 8:
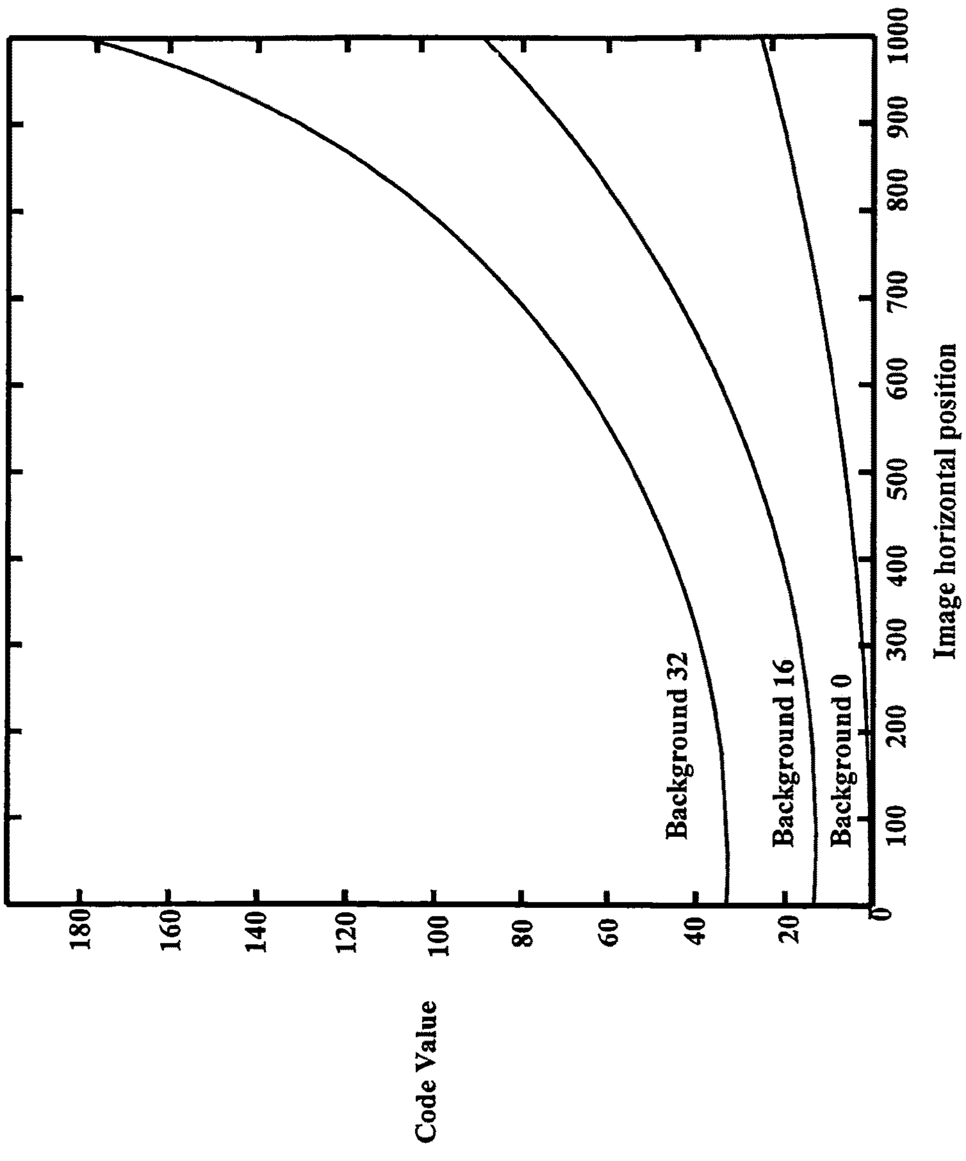
FIG. 8 illustrates compensating code values for three flat images for the spatial backlight variation of FIG. 7.
Figure 9:
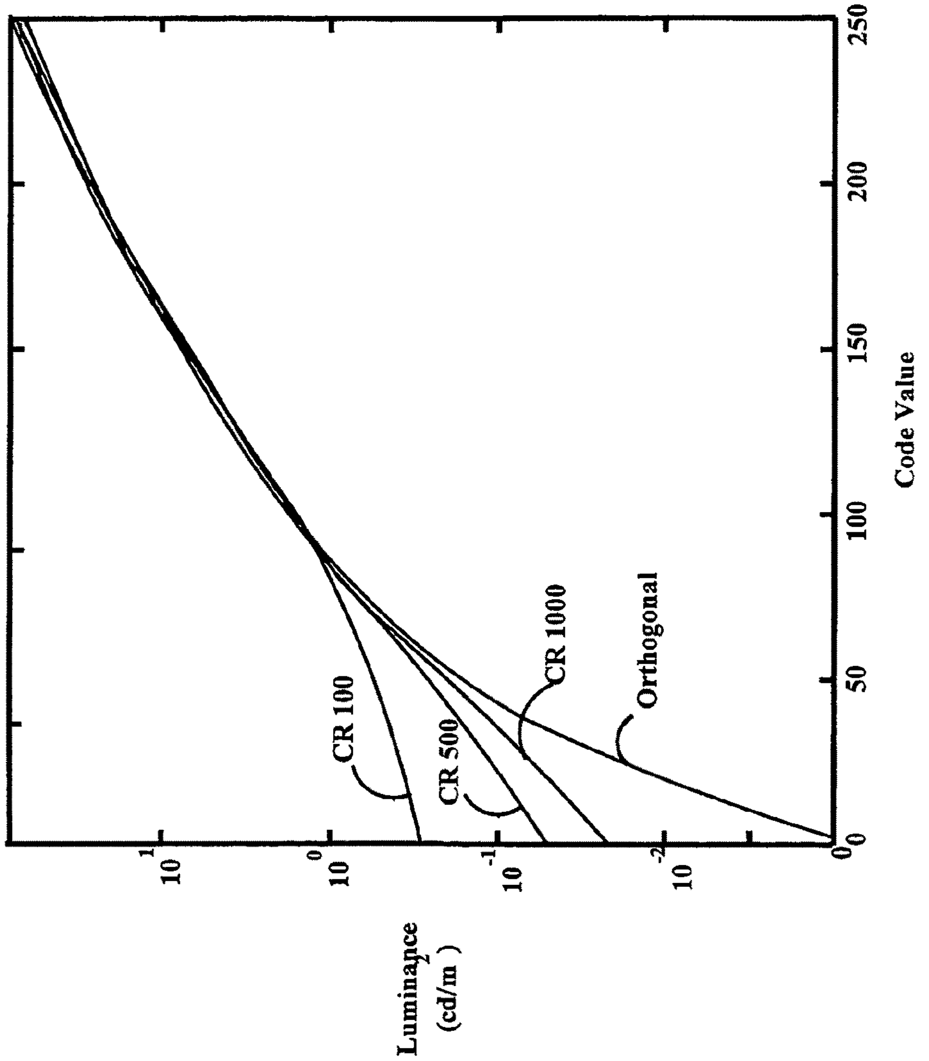
FIG. 9 illustrates tonescale variations.

Referring to FIG. 7, for purposes of illustration, assume a spatially varying backlight and a flat image with constant code value. This is typical of the spread of the backlight due to a highlight into neighboring flat regions. Referring to FIG. 8, a compensating LCD image signal may be determined based upon Equation 1 and the spatial backlight signal above. For several flat backgrounds: 0, 16, and 32, the compensating LCD signals are illustrated. Referring to FIG. 9, sample tone scales are illustrated. Below code value 50, the tonescales differ significantly. Thus inaccurate compensation occurs when the compensated image has code values below 50 for horizontal positions less than 600.

Figure 10:
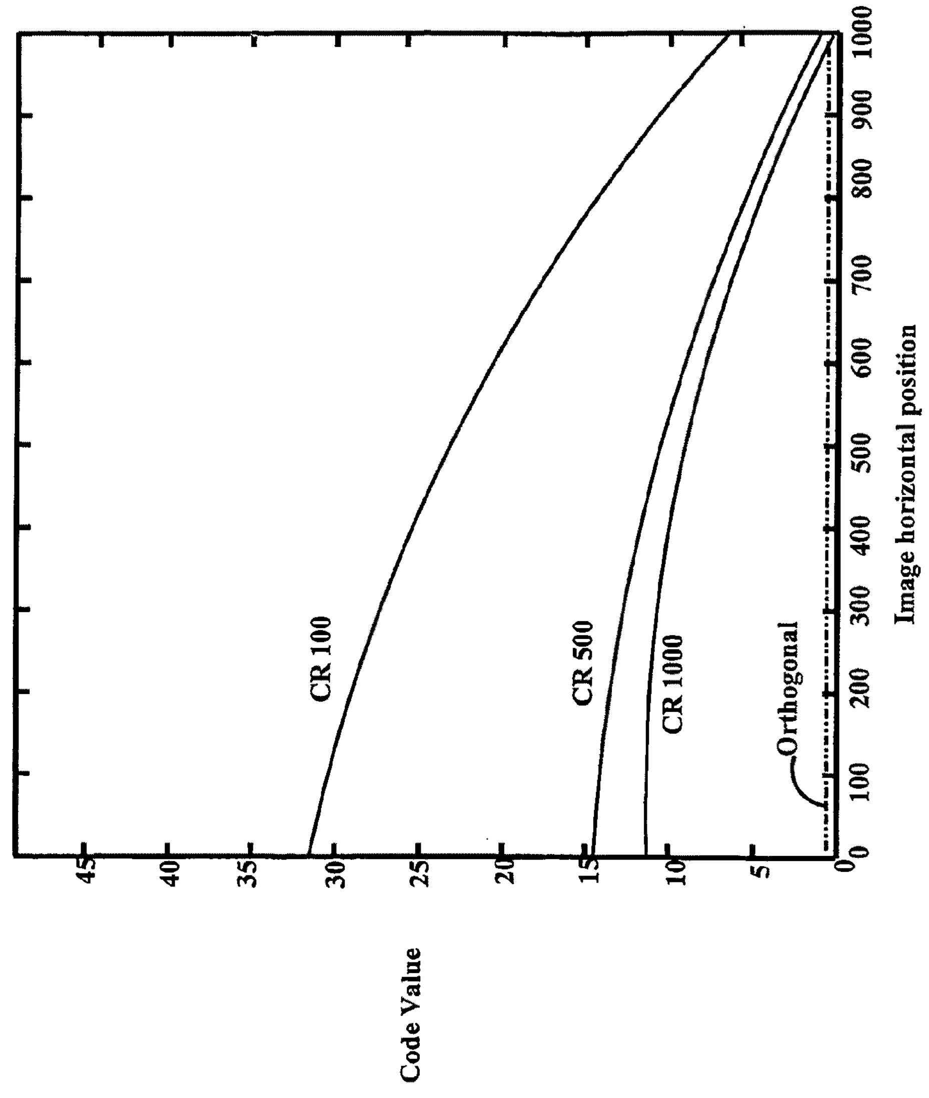
FIG. 10 illustrates the resulting code values for a constant 0 code value for different tonescale variations.
Figure 11:
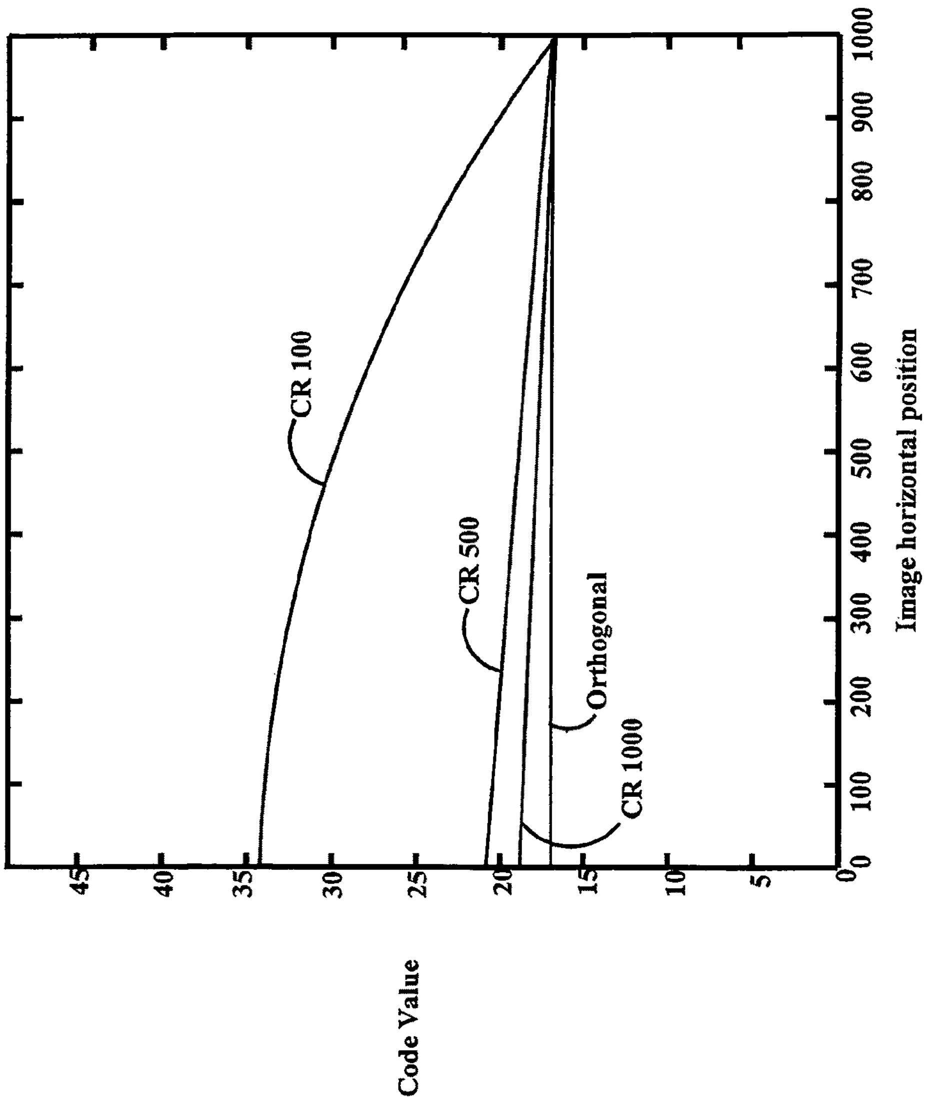
FIG. 11 illustrates the resulting code values for a constant 16 code value for different tonescale variations.
Figure 12:
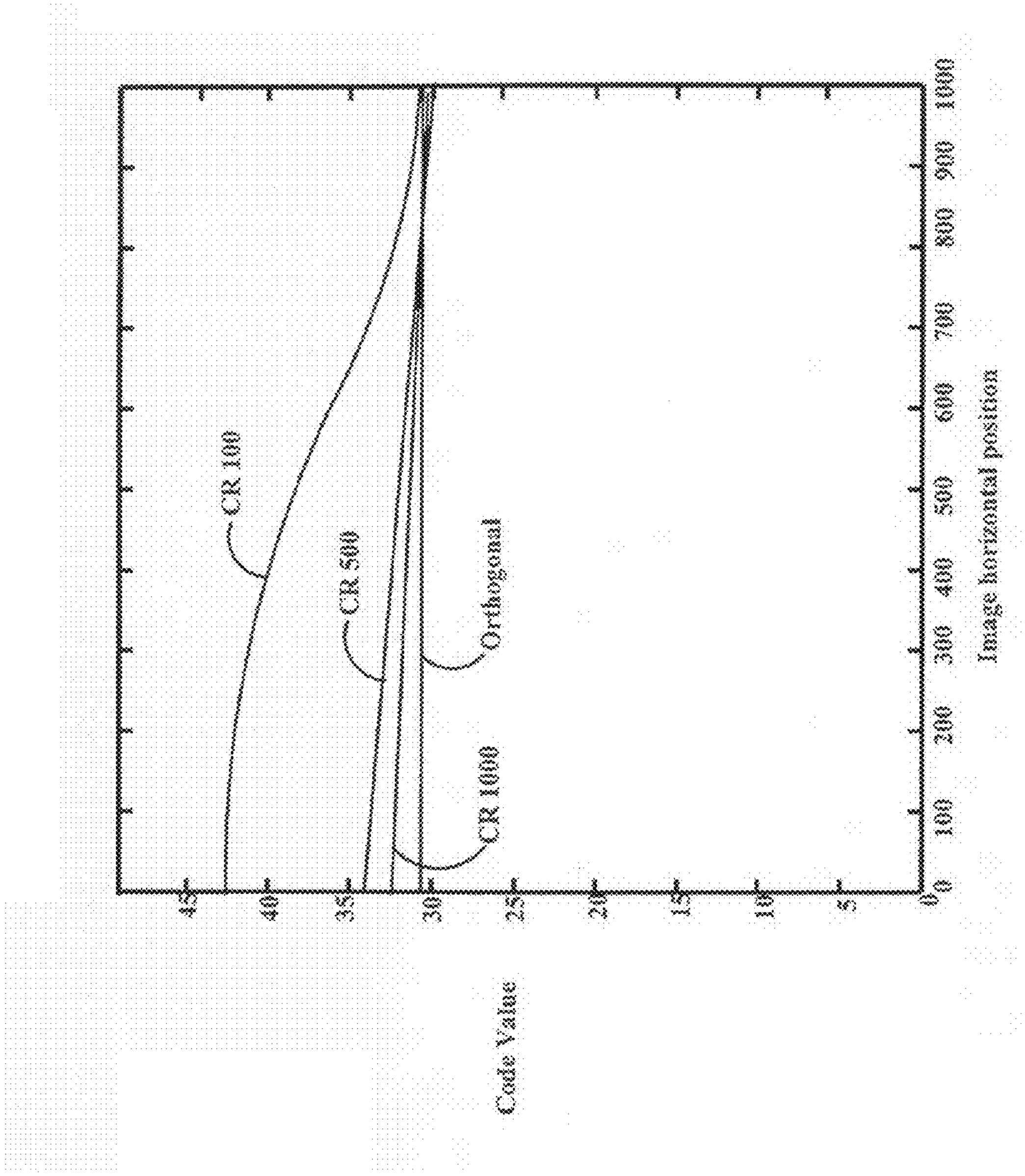
FIG. 12 illustrates the resulting code values for a constant 32 code value for different tonescale variations.

It is useful to compare the orthogonal view which has "perfect compensation" with the image signal emulating a different tone scale to observe the effects. FIG. 10 illustrates different tone scales for a constant zero value (see FIG. 7). FIG. 11 illustrates different tone scales for a constant 16 value (see FIG. 7). FIG. 12 illustrates different tone scales for a constant 32 value (see FIG. 7). In all cases, the orthogonal view is constant and the modulation present in the emulated images is due to a combination of spatial backlight modulation and modulation in the compensating image. These images all show additional brightness in areas where the compensating image has low code values. The effect is more pronounced as the tonescale variation is larger.

Figure 13:
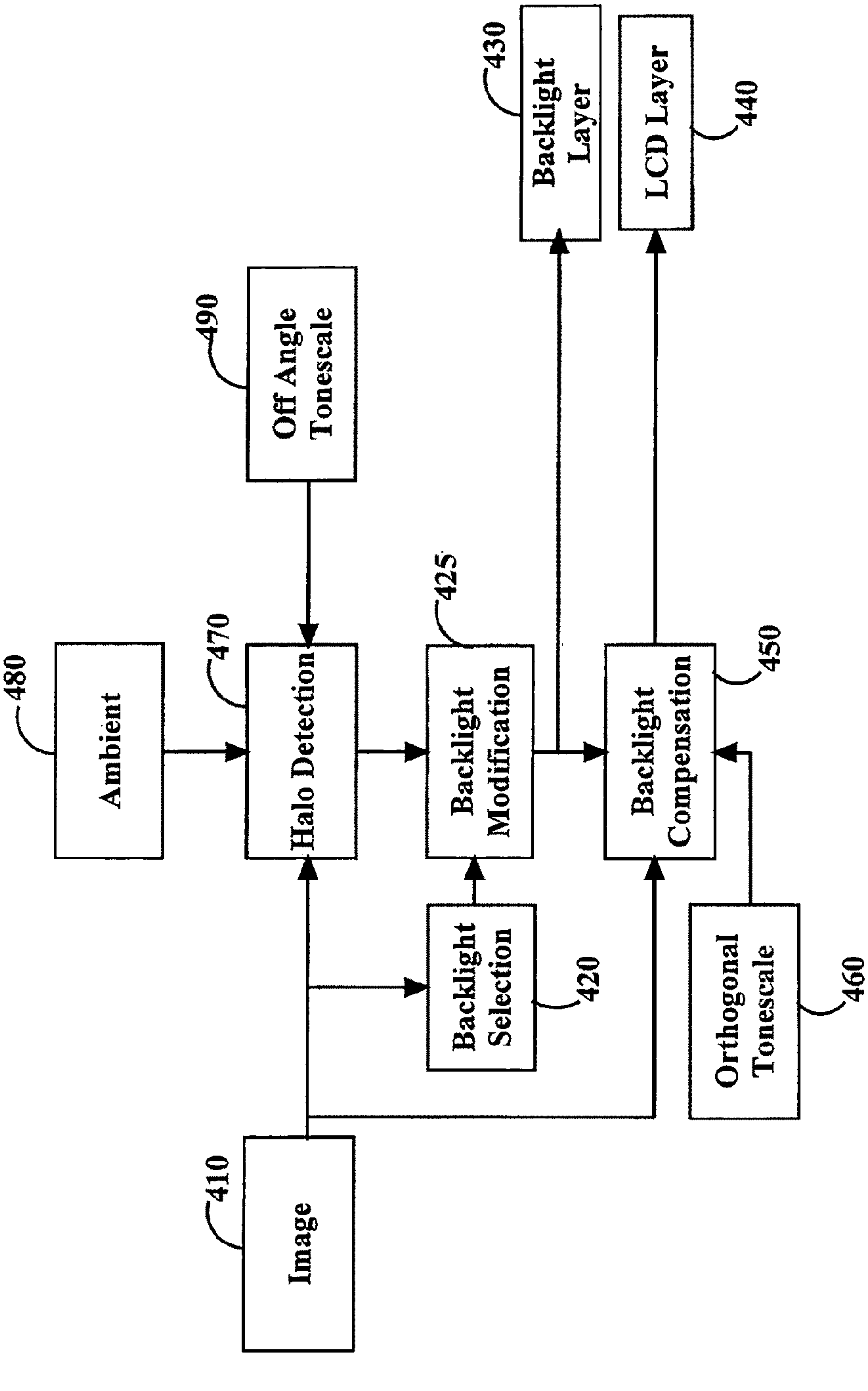
FIG. 13 illustrates another halo reduction architecture.

Referring to FIG. 13, another implementation of an off-axis artifact and reduction technique is a halo mitigation technique. The strength of the applied correction for a region is based upon a measure of the halo visibility in the region of the image. This avoid otherwise introducing artifacts into areas not containing sufficient halo artifacts while simultaneously permitting a strong halo mitigation technique to be applied to regions containing sufficient halos.

An input image 410 is received. A set of backlight values 420 are selected by the system for respective regions of the backlight. A halo detection 470 technique may be applied based upon the input image 410. Any suitable halo detection technique may be used. In particular, the halo detection technique preferably acts locally on the image so as not to identify regions not having sufficient halo effects. In addition, the halo detection 470 technique may be based upon ambient light levels 480, and/or an off-angle tonescale 490. Based upon the halo detection 470 and the backlight selection 420, the backlight is modified 425 to reduce the halo effects. Any suitable halo mitigation technique may be used. In particular, the halo mitigation technique preferably acts locally on the image so as not to mitigate regions not having sufficient halo effects. The data from the backlight modification 425 is provided to the backlight layer 430. To determine a suitable value for the corresponding LCD layer 440, a backlight compensation 450 is based upon the division of the image 410 by the backlight selection 120, or any other suitable technique. In addition, the backlight compensation 150 may be further based upon an orthogonal tonescale 460 for the display. In general, regional mitigation of off-axis artifacts may be based upon regional areas of the image. Further, the regional mitigation for a particular image of a video is preferably performed by processing the single frame of the video.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for modifying an image to be displayed on a display comprising:

(a) receiving an image to be displayed on said display having a backlight and a transmissive panel, modifying the image to determine an off-axis image, and detecting the presence of halo artifacts in said off-axis image;

(b) providing a backlight signal to said backlight for causing said backlight to selectively illuminate different portions of said backlight with different characteristics, wherein said characteristics include at least one of a different color and a difference luminance;

(c) providing a panel signal to said panel for causing said transmissive panel to selectively change its transmissivities;

(d) wherein at least one of said backlight signal and said panel signal are modified in selected regions of said display in a manner to reduce any off-axis halo artifacts detected in said selected regions.

2. The method of claim 1 wherein a portion of said backlight is selectively decreased in illumination while a corresponding portion of said panel is selectively increased in transmittivity to reduce said off-axis artifacts.

3. The method of claim 2 wherein said transmittivity is substantially modified toward maximum transmittivity in regions of a potential off-axis artifact to a greater extent than it would have been without said potential off-axis artifact.

4. The method of claim 1 wherein a portion of said backlight is selectively increased in illumination while a corresponding portion of said panel is selectively decreased in transmittivity to reduce said off-axis artifacts.

5. The method of claim 4 wherein said transmittivity is substantially modified toward minimum transmittivity in regions of a potential off-axis artifact to a greater extent than it would have been without said potential off-axis artifact.

6. The method of claim 1 wherein when said image has uniform luminance values different portions of said backlight have different luminances while different portions of said panel have different transmittivities while providing a substantially uniform image to a viewer observing said display in a perpendicular direction.

7. The method of claim 1 wherein said at least one of said backlight signal and said panel signal are modified based upon an ambient light level.

8. The method of claim 1 wherein said at least one of said backlight signal and said panel signal are modified based upon an anticipated viewing angle.

9. The method of claim 1 wherein said at least one of said backlight signal and said panel signal are modified based upon image contrast.

10. The method of claim 1 wherein said at least one of said backlight signal and said panel signal are modified based upon a tone scale of said display.

11. The method of claim 1 wherein a region of said display determined not to have sufficient off-axis artifacts are not modified in a manner to reduce off-axis artifacts in selected regions of said display.

12. The method of claim 1 wherein the strength of said modification is based upon the degree of said off-axis artifacts.

13. The method of claim 1 wherein said modification is based upon a single image and modifies said single image.

14. The method of claim 1 wherein said modification is based upon selected sub-pixels of said display.

15. The method of claim 1 wherein a selected region of said display determined to have sufficient off-axis artifacts are modified to reduce said off-axis artifacts.

16. The method of claim 15 wherein said selected region is based upon a spatial extent of said selected region.

* * * * *